United States Patent
Kellogg et al.

(10) Patent No.: US 7,095,193 B2
(45) Date of Patent: Aug. 22, 2006

(54) BRUSHLESS DC MOTORS WITH REMOTE HALL SENSING AND METHODS OF MAKING THE SAME

(75) Inventors: Michael I. Kellogg, Newhall, CA (US); M. Robert Mock, Moorpark, CA (US)

(73) Assignee: HR Textron, Inc., Santa Clarita, CA (US)

( * ) Notice: Subject to any disclaimer, the term of this patent is extended or adjusted under 35 U.S.C. 154(b) by 0 days.

(21) Appl. No.: 10/848,888

(22) Filed: May 19, 2004

(65) Prior Publication Data

US 2005/0258786 A1    Nov. 24, 2005

(51) Int. Cl.
*H02K 1/27*    (2006.01)
(52) U.S. Cl. ............... 318/254; 318/254; 318/138; 318/139; 318/439
(58) Field of Classification Search ........... 318/138, 318/254, 439, 722–724; 310/68 B, 156.05, 310/156.06; 324/179
See application file for complete search history.

(56) References Cited

U.S. PATENT DOCUMENTS

| | | | | |
|---|---|---|---|---|
| 3,644,765 A | * | 2/1972 | Janson | 310/68 R |
| 3,783,359 A | * | 1/1974 | Malkiel | 318/254 |
| 4,099,104 A | * | 7/1978 | Muller | 318/138 |
| 4,112,408 A | * | 9/1978 | Roozenbeek | 338/32 H |
| 4,115,715 A | * | 9/1978 | Muller | 310/68 B |
| 4,188,605 A | * | 2/1980 | Stout | 338/32 H |
| 4,275,703 A | | 6/1981 | Bodig et al. | 123/617 |
| 4,339,875 A | * | 7/1982 | Muller | 29/602.1 |
| 4,539,520 A | | 9/1985 | McBride | 324/117 |
| 4,547,714 A | * | 10/1985 | Muller | 318/254 |
| 4,689,532 A | * | 8/1987 | Howlett | 318/254 |
| 4,772,929 A | | 9/1988 | Manchester | 357/27 |
| 4,965,517 A | | 10/1990 | Shelton et al. | 324/174 |
| 5,093,617 A | * | 3/1992 | Murata | 324/235 |
| 5,115,194 A | | 5/1992 | Luetzow et al. | 324/207 |
| 5,237,272 A | | 8/1993 | Murata et al. | 324/207.2 |

(Continued)

FOREIGN PATENT DOCUMENTS

EP    0 936 723 A1    8/1999

(Continued)

OTHER PUBLICATIONS

Application Note 27701B, "Hall-Effect IC Applications Guide," copyright 1987, 1987, Allegro MicroSystems, 115 Northeast Cutoff, Box 15036, Worcester, MA 01615-0036.*

(Continued)

*Primary Examiner*—Rina Duda
*Assistant Examiner*—Robert Horn
(74) *Attorney, Agent, or Firm*—BainwoodHuang

(57) ABSTRACT

A brushless DC motor apparatus includes a housing and a stator assembly coupled to the housing. The apparatus further includes a magnetic rotor assembly rotatably coupled to the housing. The magnetic rotor assembly is configured to rotate within the housing in response to electric currents through windings of the stator assembly. The apparatus further includes position sensors which are configured to provide position signals identifying angular position of the magnetic rotor assembly relative to the stator assembly. Each position sensor includes (i) a Hall-effect sensor disposed distally from the windings, and (ii) magnetic circuit members having first end portions adjacent the windings and proximate rotor magnets and second end portions adjacent the Hall-effect sensor. Use of such magnetic circuit members enables the Hall-effect sensors to reside a greater distance from the windings vis-à-vis conventional brushless DC motors which position sensors adjacent to stator coils within motor casings.

17 Claims, 4 Drawing Sheets

U.S. PATENT DOCUMENTS

| | | | |
|---|---|---|---|
| 5,264,792 A | 11/1993 | Luetzow et al. | 324/207.2 |
| 5,300,883 A * | 4/1994 | Richeson | 324/207.22 |
| 5,321,355 A | 6/1994 | Luetzow | 324/207.2 |
| 5,568,022 A | 10/1996 | Tranovich | 318/566 |
| 5,600,192 A * | 2/1997 | Carson et al. | 310/68 B |
| 5,811,968 A * | 9/1998 | Nakazawa et al. | 324/207.2 |
| 5,818,139 A * | 10/1998 | Yamagiwa et al. | 310/156.45 |
| 5,889,400 A * | 3/1999 | Nakazawa | 324/207.2 |
| 5,942,895 A * | 8/1999 | Popovic et al. | 324/251 |
| 6,025,665 A * | 2/2000 | Poag et al. | 310/89 |
| 6,184,679 B1 * | 2/2001 | Popovic et al. | 324/251 |
| 6,239,564 B1 | 5/2001 | Boe et al. | 318/254 |
| 6,300,739 B1 | 10/2001 | Ratliff et al. | 318/689 |
| 6,356,073 B1 * | 3/2002 | Hamaoka et al. | 324/207.2 |
| 6,373,241 B1 * | 4/2002 | Weber et al. | 324/207.2 |
| 6,404,186 B1 * | 6/2002 | Schodlbauer | 324/207.2 |
| 6,460,567 B1 * | 10/2002 | Hansen et al. | 137/554 |
| 6,462,537 B1 * | 10/2002 | Kogure et al. | 324/207.2 |
| 6,497,035 B1 | 12/2002 | Ratliff | 29/596 |
| 6,522,130 B1 * | 2/2003 | Lutz | 324/207.2 |
| 6,545,462 B1 * | 4/2003 | Schott et al. | 324/207.2 |
| 6,628,021 B1 * | 9/2003 | Shinohara et al. | 310/68 B |
| 6,683,397 B1 * | 1/2004 | Gauthier et al. | 310/68 B |
| 6,693,422 B1 * | 2/2004 | Lutz | 324/207.2 |
| 6,707,183 B1 * | 3/2004 | Breynaert et al. | 310/68 B |
| 6,707,292 B1 * | 3/2004 | Viola | 324/207.2 |
| 6,753,629 B1 * | 6/2004 | Doi et al. | 310/68 D |
| 6,798,156 B1 * | 9/2004 | Boscolo | 318/254 |
| 6,819,022 B1 * | 11/2004 | Yamamoto et al. | 310/156.05 |
| 6,867,581 B1 * | 3/2005 | Bendicks et al. | 324/207.13 |
| 6,919,659 B1 * | 7/2005 | Rapp | 310/90 |
| 2002/0016087 A1 | 2/2002 | Breynaert et al. | 439/38 |
| 2002/0021124 A1 | 2/2002 | Schot et al. | 324/207.2 |
| 2003/0216877 A1 | 11/2003 | Culler et al. | 702/64 |
| 2005/0258786 A1 * | 11/2005 | Kellogg et al. | 318/254 |

FOREIGN PATENT DOCUMENTS

| | | |
|---|---|---|
| FR | 2 717 324 | 3/1994 |
| WO | WO 01/28076 A1 | 4/2001 |

OTHER PUBLICATIONS

Servo, Linear & Motion Control Products, Baldor Motion Products, created Apr. 15, 2002, modified Aug. 28, 2002, Baldor Elecric Company, 5711 R.S. Boreham , Jr. St., Fort Smith AR 72901 pp. E1 and E10.*

SS4/SS5/SS400/SS500 Low Gauss Bipolar Hall Effect Sensors: Industry: Manufacturing Application: Brushless Motor, created Dec. 11, 2001, Honeywell Sensing and Control, 11 W. Spring St., Freeport, IL 61032.*

Couetoux, et al., (French Patent Office, 2 717 324), Jan. 15, 1995, translated by FLS, Inc. Mar. 2006.*

H. Blanchard, Ch. Schott, Microsystems Design Group, High Sensitivity Hall Sensor, http://1mis3.epfl.ch/research/old/cylhall/ date printed Dec. 1, 2003.

* cited by examiner ies within a variety of industries. For example, the
BRUSHLESS DC MOTORS WITH REMOTE HALL SENSING AND METHODS OF MAKING THE SAME

BACKGROUND

Brushless direct current (DC) motors have a variety of applications within a variety of industries. For example, the aerospace industry often uses brushless DC motors for servo and remote control tasks such as controlling the aircraft control surface, and servovalve or fuel valve operation.

One conventional brushless DC motor includes a rotor, a stator and a motor controller. The rotor typically includes a shaft and a set of permanent magnets mounted to the shaft. The stator typically includes a motor casing and coils which are typically wound in slots inside of the motor casing. The rotor shaft couples to the motor casing such that the rotor is capable of rotating relative to the casing, and such that the stator coils surround the set of permanent magnets mounted to the shaft.

The motor controller typically includes Hall-effect sensors and a control circuit. The Hall-effect sensors sit adjacent to the motor coils fixed to the motor stator and in close proximity to the rotor magnets to enable the Hall-effect sensors to adequately sense a magnetic field by the permanent magnets of the rotor. The control circuit electrically connects to both the Hall-effect sensors and the stator coils.

During this magnetic field sensing operation, the Hall-effect sensors provide electric signals to the control circuit which enables the control circuit to determine the angular position of the rotor within the stator. The control circuit can consequently control the motor commutation process and output currents to the stator coils in a way that controls the position of the rotor relative to the stator. The currents in the stator coils generate a magnetic field, which produces torque by interaction with the permanent magnets on the rotor shaft pushing the rotor to rotate about the rotor shaft to a new position. Such operation enables the brushless DC motor to remotely perform tasks, e.g., to make servovalve adjustments to modify a position of a wing flap, to change a metering position of a fuel valve, etc.

SUMMARY

Unfortunately, there are deficiencies to the above-described conventional brushless DC motor having Hall-effect sensors sitting adjacent to the coils within the motor casing. For example, in many aerospace servovalve applications, the currents through the stator coils generate a large amount of heat, and this heat has a detrimental affect on the Hall-effect sensors. In particular, the temperature of the stator coils in such motors may easily exceed 150 degrees Celsius, while many Hall-effect sensors have a maximum operating temperature which is less than 150 degrees Celsius and such sensors typically fail to function properly when exposed to temperatures over 150 degrees Celsius. Accordingly, in the above-described conventional brushless DC motor, the maximum operating temperature that the Hall-effect sensors can withstand without failing provides a limit on the severity of the duty cycle that the brushless DC motor can endure. As a result, external motor cooling, larger motors or imposition of duty cycle is required to prevent Hall-effect sensor overheating. Further as a result, servovalve manufacturers typically use brushless DC motors having higher-end and more expensive sensors which are capable of tolerating these higher operating temperatures.

Additionally, the environment within the motor casing typically sees high amounts of electromagnetic interference (EMI) from flux variations as the motor operates. This EMI can potentially disrupt the operation of the Hall-effect sensors leading to signal distortion and/or corrupt operation. Accordingly, the presence of strong EMI within the motor casing makes the environment within the motor casing even more hostile to the Hall-effect sensor signals.

In contrast to the above-described conventional brushless DC motor which includes Hall-effect sensors adjacent stator coils, embodiments of the invention are directed to brushless DC motor configurations which utilize position sensors having (i) Hall-effect sensors disposed distally from the motor windings and (ii) magnetic circuit members having first ends proximate to the rotor magnets and adjacent the windings and second ends adjacent the Hall-effect sensors. Such configurations enable Hall-effect sensors to be installed remotely from the windings in a less hostile environment (e.g., in cooler locations with less EMI) but still enable the Hall-effect sensors to robustly and reliably perform sensing operations for proper determination of rotor position.

One embodiment is directed to a brushless DC motor apparatus. The apparatus includes a housing and a stator assembly coupled to the housing. The stator assembly has a support and windings coupled to the support. The apparatus further includes a magnetic rotor assembly rotatably coupled to the housing. The magnetic rotor assembly is configured to rotate within the housing in response to electric currents through the windings. The apparatus further includes position sensors which are configured to provide position signals identifying angular position of the magnetic rotor assembly relative to the stator assembly. Each position sensor includes (i) a Hall-effect sensor disposed distally from the windings, and (ii) magnetic circuit members having first end portions adjacent to the windings and proximate to rotor magnets and second end portions adjacent to the Hall-effect sensor. The use of such magnetic circuit members enables the Hall-effect sensors to reside a greater distance away from the windings (e.g., outside the housing) vis-à-vis conventional brushless DC motors which position Hall-effect sensors adjacent to stator coils within motor casings.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to brushless DC motor configurations which utilize position sensors having (i) Hall-effect sensors disposed remotely from the motor windings and (ii) magnetic circuit members having first ends adjacent the windings and second ends adjacent the Hall-effect sensors. Such configurations enable Hall-effect sensors to be installed distally from the windings in a less hostile environment (e.g., in cooler locations with less electromagnetic interference) while still enabling the Hall-effect sensors to perform sensing operations for robust and reliable identification of rotor position.

Figure 1:
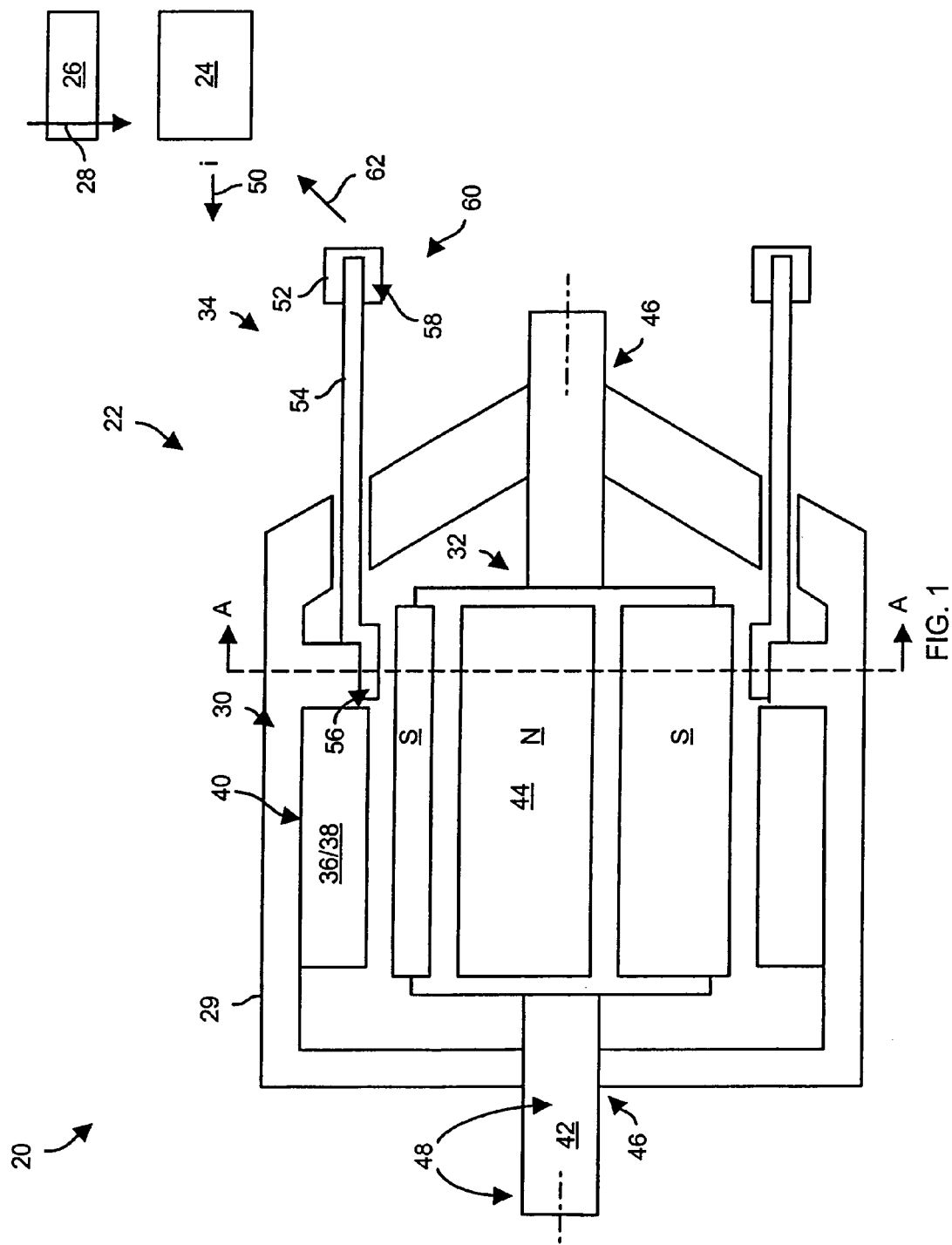
FIG. 1 is a general view of a brushless DC motor system which is suitable for use by embodiments of the invention.

FIG. 1 shows a brushless DC motor system 20 which is suitable for use by embodiments of the invention. The brushless DC motor system 20 includes a brushless DC motor apparatus 22, a controller 24 and an interface 26. During operation, the controller 24 receives commands 28 through the interface 26 (e.g., control signals from a user input device) and controls the operation (e.g., the positioning or torque) of the motor apparatus 22 based on the commands 28.

As shown in FIG. 1, the motor apparatus 22 includes a housing or casing 29, a stator assembly 30, a magnetic rotor assembly 32, and position sensors 34. The stator assembly 30 includes a winding support 36 (e.g., an iron core, iron laminates, one or more other or similar types of slotted cores, etc.) and windings 38 attached to the winding support 36 which connect to the housing 29 at locations 40. The magnetic rotor assembly 32 includes a shaft 42 and permanent magnets 44, which alternate outfacing North pole/South pole orientation, disposed on the shaft 42 (e.g., fastened to the shaft 42, integrated within a portion of the shaft 42, etc.). The rotor assembly 32 couples to the housing 29 at locations 46 (e.g., using suitable bushings or bearings), and is capable of rotating relative to the stator assembly 30 in either direction as illustrated by the arrows 48 (i.e., about the long axis of the shaft 42) in response to electric currents 50 through the windings 38, which are provided by the controller 24.

As further shown in FIG. 1, each position sensor 34 is coupled to the housing 29 and includes (i) a Hall-effect sensor 52 disposed distally from the windings 38, and (ii) magnetic circuit members 54 having first end portions 56 adjacent to the windings 38 and proximate the permanent magnets 44 and second end portions 58 adjacent to the Hall-effect sensor 52.

It should be understood that the Hall-effect sensors 52 are shown, by way of example only, at locations 60 which are external to the housing 29 for enhanced temperature and EMI relief. In particular, the housing 29 shields the Hall-effect sensors 52 from heat generated by the windings 38 and EMI generated by flux variations as the motor apparatus 22 operates. Additionally, locating the Hall-effect sensors 52 external to or outside the housing 29 conveniently enables ventilation for improved cooling of the Hall-effect sensors 52. Nevertheless, in other arrangements, the Hall-effect sensors 52 reside within the housing 29 but at a distance from the windings 38 which is great enough to reduce heat transfer from the windings 38 and, thus, enable the Hall-effect sensors 52 to operate at a temperature (e.g., below 150 degrees Celsius) which is substantially lower than that adjacent to the windings 38 (e.g., above 150 degrees Celsius).

During operation of the brushless DC motor system 20, the interface 26 conveys commands 28 to the controller 24. For instance, suppose that a user wishes to move the magnetic rotor assembly 32 from an initial position to a reference (or null) position relative to the stator assembly 30. To this end, the user provides a command 28 to the controller 24 through the interface 26. In response to the command 28, the controller 24 determines the present position of the rotor assembly 32 relative to the stator assembly 30 based on signals 62 from the Hall-effect sensors 52, and then provides the electric currents 50 to the windings 38 in correctly commutated sequence. As a result, the windings 38 generate a magnetic field so that the windings 38, together with the permanent magnets 44 on the rotor shaft 42, produce a torque on the rotor assembly 32 thus rotating the rotor assembly 32 within the stator assembly 30. It should be understood that this series of operations is capable of occurring concurrently in the manner of a feedback loop control system for accurate and precise positioning of the rotor assembly 32 relative to the stator assembly 30 and concurrently with the requisite winding commutation.

It should be understood that the operating temperature of the windings 38 (and thus the duty cycle of current "i" and coincident operating environmental temperature) is not limited by the maximum operating temperature of the Hall-effect sensors 52 since the Hall-effect sensors 52 are positioned away from the windings 38. Additionally, the operation of the Hall-effect sensors 52 are not substantially affected by EMI resulting from flux variations as the motor apparatus 22 operates. Rather, the environment at location 60 for the Hall-effect sensors 52 is less hostile (i.e., cooler and less EMI) than that at location 40. Accordingly, even Hall-effect sensors with a maximum operating temperature (e.g., less than 150 degrees Celsius) which is substantially less than the maximum operating temperature of the windings 38 (e.g., over 200 degrees Celsius) are well-suited for the brushless DC motor system 20. In one arrangement, the Hall-effect sensors 52 are standard off-the-shelf devices that are configured to provide substantially digital response to the position of the rotor magnets 44. In another arrangement, another type of off-the-shelf Hall-effect device provides a substantially analog response, as the position signals 62. Further details of embodiments of the invention will now be provided with reference to FIG. 2.

Figure 2:
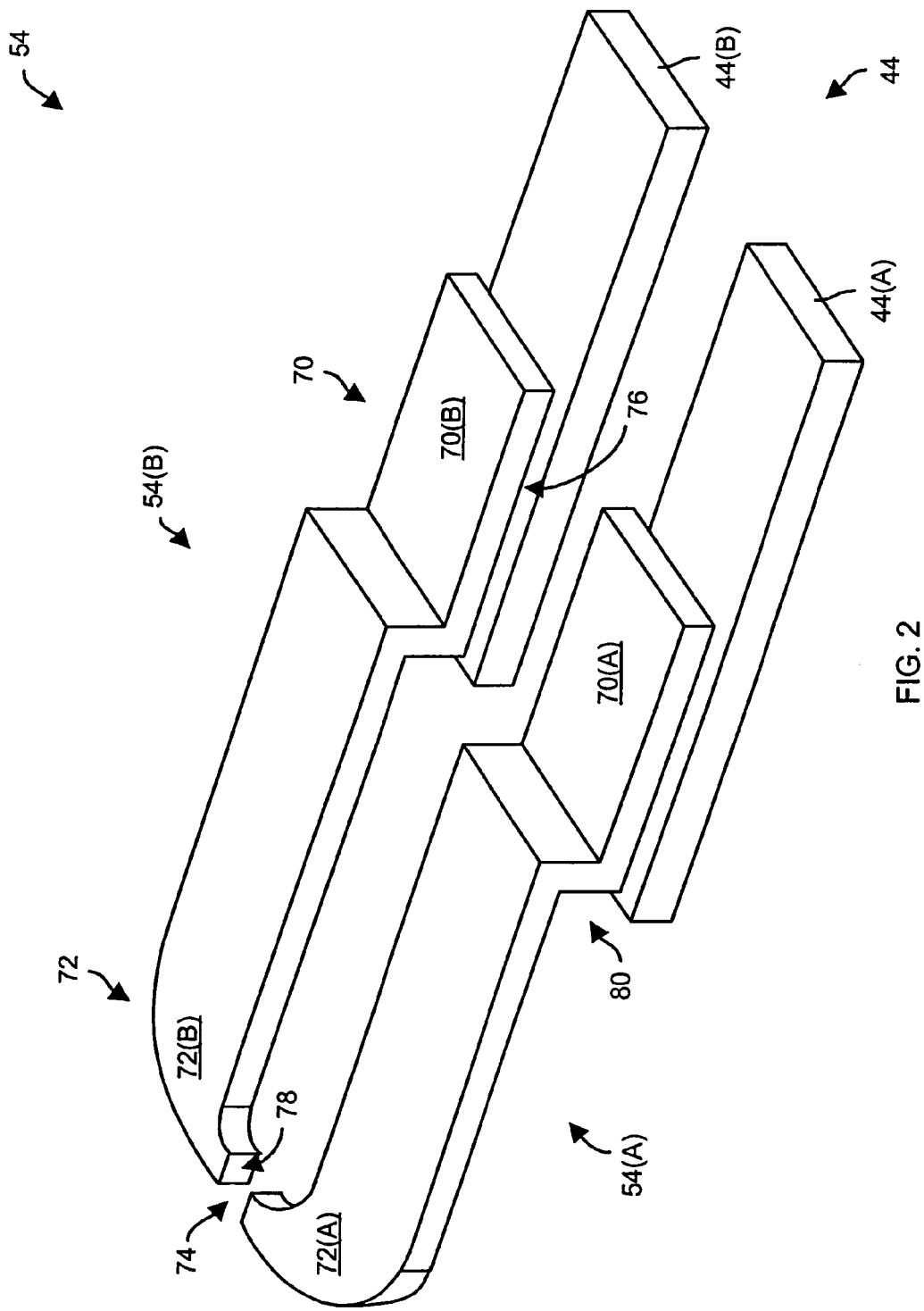
FIG. 2 is a perspective view of a pair of magnetic circuit members of the brushless DC motor system of FIG. 1.

FIG. 2 shows a perspective view of a pair of magnetic circuit members 54(A), 54(B) for one position sensor 34 and, for illustration purposes, their relationship to two permanent magnets 44(A), 44(B) of the rotor assembly 32. The magnetic circuit members 54(A), 54(B) (collectively, magnetic circuit members 54) are elongated in shape and include ferromagnetic material having high magnetic permeability such as iron or steel (i.e., a ferromagnetic material element). Accordingly, the magnetic circuit members 54 are capable of operating as magnetic field conduits by conducting a magnetic field from one location to another. To this end, the magnetic circuit members 54 include collecting portions 70(A), 70(B) (collectively, collecting portions 70, also see the arrow 56 in FIG. 1) and interfacing portions 72(A), 72(B) (collectively, interfacing portions 72, also see the arrow 58 in FIG. 1). When the magnetic circuit members 54 are installed within the brushless DC motor system 20 (also see FIG. 1), the Hall-effect sensors 52 reside in gaps 74 between the interfacing portions 72 (FIG. 2).

As shown in FIG. 2, the portions 70 of the magnetic circuit members 54 define cylindrical surfaces 76 (for ease of presentation and to facilitate the description, the surfaces 76 are shown as planar surfaces in FIG. 2) which are configured to face the permanent magnets 44. The interfacing portions 72 define, preferably but not necessarily, planar surfaces 78 which are configured to face a Hall-effect sensor 52 in the gap 74. Accordingly, the magnetic circuit members 54 effectively convey, and concentrate, a magnetic field from the locations 56 adjacent the windings 38 and the permanent magnets 44 (i.e., a potentially hostile high temperature and high EMI environment to the Hall-effect sensors 52) to the remote locations 60 which are distal to the windings 38 where the Hall-effect sensors 52 reside (also see FIG. 1).

As further shown in FIG. 2, the surface 76 which is configured to aim at the rotor assembly 32 has a surface area which is substantially greater than that of the planar surface 78 which is configured to reside adjacent a Hall-effect sensor 52. That is, the magnetic circuit members 54 present a large surface area to the permanent magnets 44 and small surface area to the Hall-effect sensors 52. Accordingly, this configuration reduces losses and concentrates the magnetic flux through the Hall-effect sensors 52 for effective Hall sensing at the remote locations 60 which would otherwise potentially be unsuitable for remote Hall sensing. Since the Hall-effect sensors 52 are located away from the motor components (e.g., the windings 38), the motor components are capable of running hotter without damaging the Hall-effect sensors 52.

It should be understood that additional geometries and shapes are suitable for use by the magnetic circuit members 54. For example, as shown in FIG. 2, the magnetic circuit member 54 define bends or joints at mid-portions 80 (e.g., notched segments) to accommodate the windings 38 of the stator assembly 30 (also see FIG. 1). Other bends, shapes and contortions can be made as well, e.g., slightly bending or arcing of the planes of the mid-portions 80 of the magnetic circuit members 54 in order to conduct magnetic field from the rotor assembly 32, which is generally round, to individual Hall-effect sensors 52. Further details of embodiments of the invention will now be provided with reference to FIG. 3.

Figure 3:
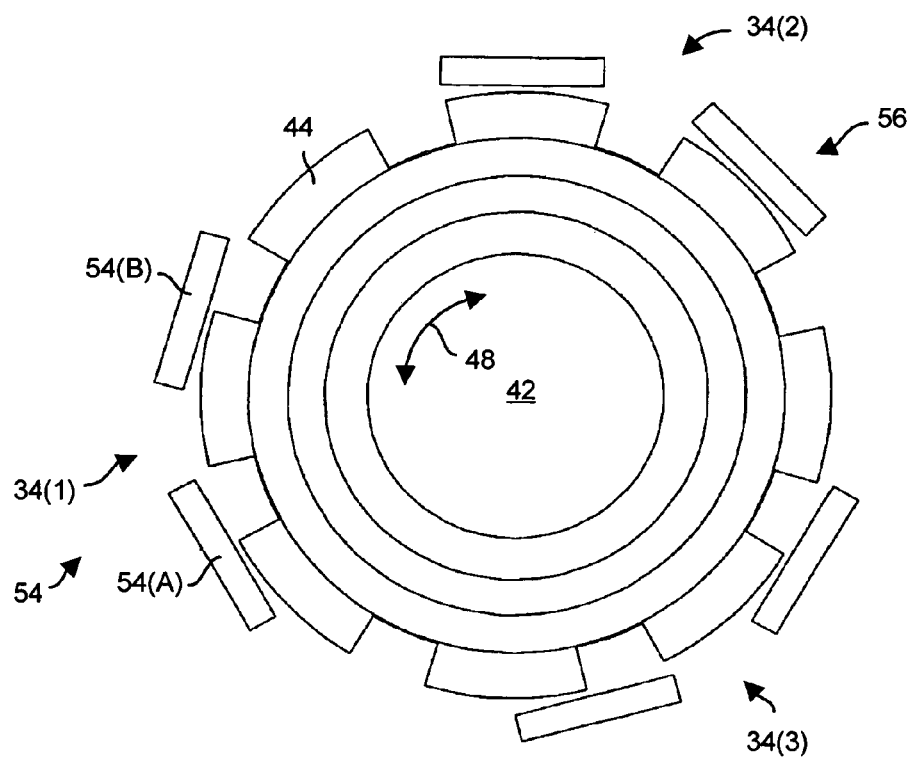
FIG. 3 is a cross-section view of a brushless DC motor apparatus of the brushless DC motor system of FIG. 1.

FIG. 3 shows a cross-sectional diagram of a portion of the brushless DC motor apparatus 22 along the dashed line A—A in FIG. 1 when the apparatus 22 utilizes three position sensors 34(1), 34(2), 34(3) (collectively, position sensors 34). In particular, FIG. 3 shows the positions of the magnetic circuit members 54 relative to the permanent magnets 44 for a 4-pole three phase motor. The permanent magnets 44, which alternate between North pole outfacing and South pole outfacing, are substantially evenly distributed around the shaft 42 of the rotor assembly 32. Contrastingly, the position sensors 34 have pairs of magnetic circuit members 54 which are disposed around a periphery of the rotor assembly 32 in a manner to correctly determine commutation positions. It should be understood that only the first end portions 56 of the magnetic circuit members 54 are shown in FIG. 3, and that the remaining portions of the magnetic circuit members 54 and the Hall-effect sensors 52 are purposefully omitted from FIG. 3 for simplification. Nevertheless, it should be understood that the mid-portions 80 of the magnetic circuit members 54 extend and bend such that the interfacing portions 78 of the magnetic circuit members 54 conveniently face respective Hall-effect sensors 52 for robust, remote Hall sensing.

In one arrangement, the brushless DC motor apparatus 22 has three phases and thus includes three position sensors 34 (i.e., the same number of position sensors 34) to adequately provide for proper commutation. In other arrangements, the brushless DC motor apparatus 22 has a different number of phases and thus includes a different number of position sensors 34. In general, more sensors are required for motors with more phases, and fewer sensors are required for motors with fewer phases. However, in some arrangements, more sensors are used than number of motor phases so that the excess sense signals are capable of being used to provide redundancy or greater position accuracy or both. In other arrangements, fewer sensors are used than the number of phases and the rotor position is derived from a combination of the sensor signals.

It should be understood that the permanent magnets 44 have been shown aligned with magnetic circuit members 54 in FIGS. 2 and 3 by way of example only, and that the permanent magnets 44 will move in either direction of the arrow 48 (FIG. 3) during operation. In particular, as the magnetic rotor assembly 32 rotates (see the arrow 48), the magnetic circuit members 54 conduct magnetic flux from the permanent magnets 44 to the Hall-effect sensors 52, and the Hall-effect sensors 52 measure the magnetic flux density. It is known that the intensity of a magnetic field, in air, from a dipole is inversely proportional to the cube of the distance. Nevertheless, in contrast to conventional brushless DC motors which position Hall-effect sensors adjacent to the stator coils of the motors for Hall sensing, the presence of the magnetic circuit members 54, which have high magnetic permeability, effectively conduct the magnetic field to the remotely located Hall-effect sensors 52 where a less hostile environment exists (also see FIG. 1). Accordingly, the windings 38 of the brushless DC motor apparatus 22 are capable of operating for a longer period of time at a higher temperature and producing higher torque, i.e., the maximum operating temperature of the windings 38 is not limited by the sensing circuitry as in conventional brushless DC motors. Further details of embodiments of the invention will now be provided with reference to FIG. 4.

Figure 4:
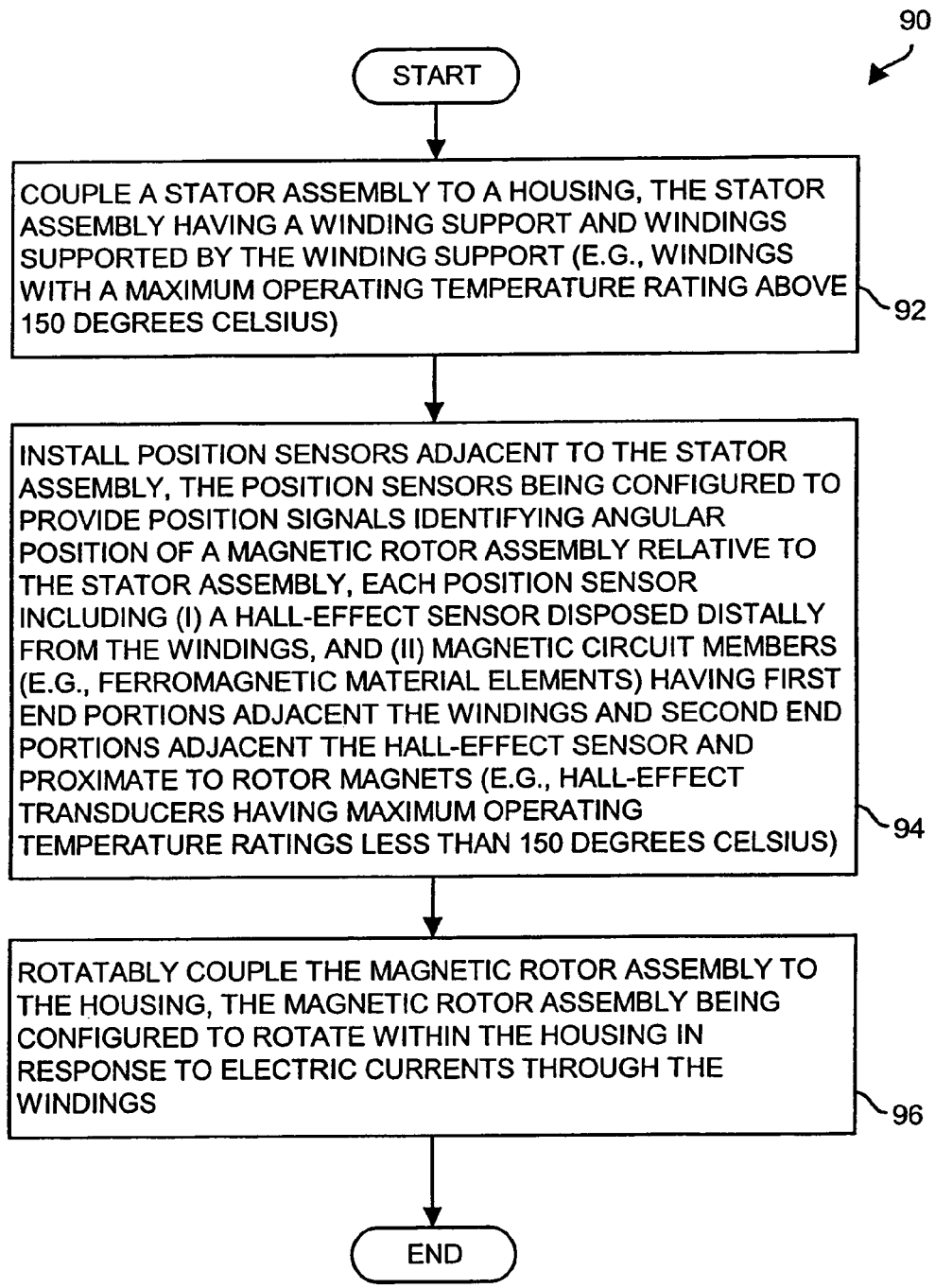
FIG. 4 is a flowchart of a procedure for manufacturing the brushless DC motor apparatus of FIG. 3.

FIG. 4 shows a flowchart of a procedure 90 which is capable of being performed by a manufacturer when making the brushless DC motor apparatus 22. It should be understood that the procedure 90 is for illustration purposes, and that other procedures are suitable for making the brushless DC motor apparatus 22 as well. In step 92, the manufacturer couples a stator assembly 30 to a housing 29. In one arrangement, the user press-fits the stator assembly 30 into the housing 29.

In step 94, the manufacturer installs portions of the position sensors 34 adjacent to the stator assembly 30. In particular, the manufacturer disposes the magnetic circuit members 54 of the position sensors 34 so that the collecting portions 70 reside close to the windings 38 but the interfacing portions 72 reside distally from the windings 38 to enable remote Hall sensing.

In step 96, the manufacturer rotatably couples the magnetic rotor assembly 34 to the housing 29 so that the magnetic rotor assembly 32 is capable of rotating within the housing 29 in response to the electric currents 50 provided through the windings 38 by the controller 24. As a result of the procedure 90, the Hall-effect sensors 52 are capable of being positioned away from the windings 38 in an environment having a lower temperature and less EMI than that adjacent the windings 38 (i.e., at locations 60, also see FIG. 1). The magnetic circuit members 54 enable conduction of the magnetic field of the permanent magnets 44 to greater distances than is possible by conducting the magnetic field through air. Accordingly, brushless DC motor manufacturers now have flexibility to locate the Hall-effect sensors 52 in a friendlier environment which has a substantially lower temperature and substantially lower EMI than that near the windings 38 and the permanent magnets 44.

As mentioned above, embodiments of the invention are directed to brushless DC motor configurations which utilize position sensors 34 having (i) Hall-effect sensors (or Hall-effect transducers) 52 disposed remotely from the motor windings 38 and (ii) magnetic circuit members 54 having first end portions 56 adjacent the windings and second end portions 58 adjacent the Hall-effect sensors 52. Such configurations enable the Hall-effect sensors 52 to be installed distally from the windings 38 in a less hostile environment (e.g., in cooler locations with less EMI) but still enable the Hall-effect sensors 52 to perform sensing operations for robust and reliable determination of rotor position.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the brushless DC motor apparatus 22 was described above as having three position sensors 34 by way of example only. In other arrangements, the motor apparatus 22 has a different number of position sensors 34 (e.g., one, two, four, etc.). With more than one position sensor 34, the motor apparatus 22 provides fault tolerance for use in critical applications such as in the aerospace industry.

Additionally, it should be understood that three position sensors were shown with the brushless DC motor apparatus 22 by way of example only. As mentioned earlier, in one arrangement, the brushless DC motor apparatus 22 has three phases and thus includes three position sensors 34 (i.e., the same number as the phases) to adequately provide for proper commutation. In other arrangements, the brushless DC motor apparatus 22 has a different number of phases and thus includes a different number of position sensors 34. In general, more sensors are required for motors with more phases, and fewer sensors are required for motors with fewer phases. However, in some arrangements, more sensors are used than number of motor phases so that the excess sense signals are capable of being used to provide redundancy or greater position accuracy or both.

Furthermore, it should be understood that the motor apparatus 22 was described above as being a brushless DC type by way of example only. Other motor configurations are suitable for use by the invention as well. For example, in one arrangement, the motor apparatus 22 is a switched reluctance motor. Such modifications and enhancements are intended to belong to particular embodiments of the invention.

What is claimed is:

1. A brushless DC motor apparatus, comprising:
 a housing;
 a stator assembly coupled to the housing, the stator assembly having a support and windings coupled to the support;
 a magnetic rotor assembly rotatably coupled to the housing, the magnetic rotor assembly being configured to rotate within the housing in response to electric currents through the windings; and
 position sensors which are configured to provide position signals identifying angular position of the magnetic rotor assembly relative to the stator assembly, each position sensor including (i) a Hall-effect sensor disposed distally from the windings, and (ii) magnetic circuit members having first end portions adjacent to the windings and proximate to rotor magnets and second end portions adjacent to the Hall-effect sensor, wherein the windings of the stator assembly are configured to operate at a maximum temperature which is greater than 150 degrees Celsius, and wherein the Hall effect sensors of the position sensors are configured to operate at a maximum temperature which is less than 150 degrees Celsius.

2. The brushless DC motor apparatus of claim 1 wherein the position sensors include:
 a first position sensor, a second position sensor, and a third position sensor, which extend through the housing and are disposed around a periphery of the magnetic rotor assembly in a manner consistent with proper motor commutation and position sensing.

3. The brushless DC motor apparatus of claim 2 wherein the Hall-effect sensors of the first, second and third position sensors are configured to generate, as the position signals, analog output signals to effectuate precise angular position identification.

4. The brushless DC motor apparatus of claim 2 wherein the Hall-effect sensors of the first, second and third position sensors are configured to generate, as the position signals, digital output signals to effectuate precise angular position identification.

5. The brushless DC motor apparatus of claim 4 wherein the magnetic rotor assembly includes:
 a shaft which is rotatably coupled to the housing; and
 permanent magnets disposed on the shaft, the permanent magnets being configured to concurrently provide (i) torque to rotate the shaft in response to the electric currents through the windings, and (ii) a magnetic field to the Hall-effect sensors of the first, second and third position sensors through the magnetic circuit members of the first, second and third position sensors.

6. The brushless DC motor apparatus of claim 1 wherein the magnetic circuit members of each position sensor includes:
 a pair of ferromagnetic material elements, each ferromagnetic material element having a first portion which defines a surface that faces the magnetic rotor assembly, and an interfacing portion which defines a surface that serves as a Hall effect sensor interface.

7. The brushless DC motor apparatus of claim 6 wherein the surface defined by the first portion of each ferromagnetic material element has a first surface area, wherein the surface defined by the interfacing portion of each ferromagnetic material element has a second surface area, and wherein the first surface area is substantially greater than the second surface area.

8. A brushless DC motor apparatus according to claim 1, wherein:
 the Hall-effect sensors are disposed distally from the windings outside one end of the housing in a direction parallel to the axis of rotation of the magnetic rotor assembly;
 the rotor magnets are disposed on a generally cylindrical shaft of the magnetic rotor assembly and have an elongated shape generally aligned with the axis of the shaft;
 the magnetic circuit elements are elongated in a direction generally aligned with the axis of the shaft and extend through the one end of the housing, and the first end portion of each magnetic circuit element is disposed immediately opposite the rotor magnets at one end thereof.

9. A brushless DC motor apparatus according to claim 8, wherein the magnetic circuit members for each position sensor describe an elongated U shape with the first end portions located at respective tips of one end of the elongated U shape and the second end portions curving towards each other to form a curved middle section at the other end of the elongated U shape.

10. A brushless DC motor apparatus according to claim 9, wherein each magnetic circuit member has a step-like bend in a respective mid-portion between the first and second end portions.

11. A brushless DC motor apparatus according to claim 9, wherein:
the elongated rotor magnets are disposed on an outer cylindrical surface of the shaft of the magnetic rotor assembly and are configured to concurrently provide (i) torque to rotate the shaft in response to the electric currents through the windings, and (ii) a magnetic field to first end portions of the magnetic circuit members position sensors;
the first end portion of each magnetic circuit member defines a respective first surface facing the elongated rotor magnets; and
the second end portion of each magnetic circuit member defines a respective interfacing portion which defines a second surface facing the respective Hall effect sensor, the surface area of the second surface being substantially less than the surface area of the first surface.

12. A brushless DC motor apparatus, comprising:
a housing;
a stator assembly coupled to the housing, the stator assembly having a support and windings coupled to the support;
a magnetic rotor assembly rotatably coupled to the housing, the magnetic rotor assembly being configured to rotate within the housing in response to electric currents through the windings; and
position sensors which are configured to provide position signals identifying angular position of the magnetic rotor assembly relative to the stator assembly, each position sensor including (i) a Hall-effect sensor disposed distally from the windings, and (ii) means for conducting a magnetic field from a location adjacent to the windings to a location adjacent to the Hall-effect sensor, wherein the windings of the stator assembly are configured to operate at a
maximum temperature which is greater than 150 degrees Celsius, and wherein the Hall effect sensors of the position sensors are configured to operate at a maximum temperature which is less than 150 degrees Celsius.

13. A DC motor system, comprising:
an interface;
a brushless DC motor apparatus which includes:
a housing;
a stator assembly coupled to the housing, the stator assembly having a support and windings coupled to the support,
a magnetic rotor assembly rotatably coupled to the housing, the magnetic rotor assembly being configured to rotate within the housing in response to electric currents through the windings, and
position sensors which are configured to provide position signals identifying angular position of the magnetic rotor assembly relative to the stator assembly, each position sensor including (i) a Hall-effect sensor disposed distally from the windings, and (ii) magnetic circuit members having first end portions adjacent to the windings and second end portions adjacent to the Hall-effect sensor,
wherein the windings of the stator assembly are configured to operate at a maximum temperature which is greater than 150 degrees Celsius, and wherein the Hall-effect sensors of the position sensors are configured to operate at a maximum temperature which is less than 150 degrees Celsius; and
a controller coupled to the interface, the wind ings of the stator assembly and the position sensors, the controller being configured to receive the position signals provided by the position sensors and generate the electric currents through the windings in response to commands from the interface.

14. The DC motor system of claim 13 wherein the position sensors of the brush less DC motor apparatus include:
a first position sensor, a second position sensor, and a third position sensor, which are coupled to the housing and disposed around a periphery of the magnetic rotor assembly.

15. The DC motor system of claim 13 wherein the magnetic circuit members of each position sensor include:
a pair of ferromagnetic material elements, each ferromagnetic material element having a first portion which defines a surface that faces the magnetic rotor assembly, and an interfacing portion which defines a surface that serves as a Hall effect sensor interface.

16. A DC motor system according to claim 13, wherein:
the Hall-effect sensors are disposed distally from the windings outside one end of the housing in a direction parallel to the axis of rotation of the magnetic rotor assembly;
the rotor magnets are disposed on a generally cylindrical shaft of the magnetic rotor assembly and have an elongated shape generally aligned with the axis of the shaft;
the magnetic circuit elements are elongated in a direction generally aligned with the axis of the shaft and extend through the one end of the housing, and the first end portion of each magnetic circuit element is disposed immediately opposite the rotor magnets at one end thereof.

17. A method for manufacturing a brushless DC motor apparatus, the method comprising:
coupling a stator assembly to a housing, the stator assembly having a support and wind ings supported by the support;
installing position sensors adjacent to the stator assembly, the position sensors being configured to provide position signals identifying angular position of a magnetic rotor assembly relative to the stator assembly, each position sensor including (i) a Hall effect sensor disposed distally from the windings, and (ii) magnetic circuit members having first end portions adjacent to the windings and second end portions adjacent to the Hall-effect sensor; and
rotatably coupling the magnetic rotor assembly to the housing, the magnetic rotor assembly being configured to rotate within the housing in response to electric currents through the windings,
wherein the windings of the stator assembly are configured to operate at a maximum temperature which is greater than 150 degrees Celsius, and wherein the Hall-effect sensors of the position sensors are configured to operate at a maximum temperature which is less than 150 degrees Celsius.

* * * * *

UNITED STATES PATENT AND TRADEMARK OFFICE
CERTIFICATE OF CORRECTION

PATENT NO. : 7,095,193 B2  
APPLICATION NO. : 10/848888  
DATED : August 22, 2006  
INVENTOR(S) : Michael I. Kellogg and M. Robert Mock It is certified that error appears in the above-identified patent and that said Letters Patent is hereby corrected as shown below:

Claim 13, Column 10, Line 5, "wind ings" should read --windings--.
Claim 14, Column 10, Line 12, "brush less" should read --brushless--.

Signed and Sealed this

Twenty-first Day of November, 2006

JON W. DUDAS  
*Director of the United States Patent and Trademark Office*